(12) United States Patent
Vogel et al.

(10) Patent No.: US 11,027,385 B2
(45) Date of Patent: Jun. 8, 2021

(54) DEVICE FOR MECHANICALLY PROCESSING A WORKPIECE

(71) Applicant: Neumayer Tekfor Engineering GmbH, Hausach (DE)

(72) Inventors: Niels Vogel, Sontra (DE); Daniel Aschenbrenner, Alheim (DE); Andreas Penner, Bad Hersfeld (DE); Steffen Trinter, Ronshausen (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 294 days.

(21) Appl. No.: 16/293,756

(22) Filed: Mar. 6, 2019

(65) Prior Publication Data
US 2019/0275624 A1    Sep. 12, 2019

(30) Foreign Application Priority Data

Mar. 7, 2018    (DE) ...................... 10 2018 001 869.6

(51) Int. Cl.
| | |
|---|---|
| *B23Q 3/18* | (2006.01) |
| *B23Q 3/06* | (2006.01) |
| *B23Q 7/02* | (2006.01) |
| *B23Q 7/03* | (2006.01) |

(Continued)

(52) U.S. Cl.
CPC ................ *B23Q 3/18* (2013.01); *B23B 31/36* (2013.01); *B23Q 3/06* (2013.01); *B23Q 7/02* (2013.01); *B23Q 7/035* (2013.01); *B23Q 7/04* (2013.01); *B23Q 2703/00* (2013.01)

(58) Field of Classification Search
CPC ....... B23B 31/00; B23B 31/02; B23B 31/026; B23B 31/34; B23B 31/36; B23Q 3/152; B23Q 3/12; B23Q 3/14; B23Q 3/06; B23Q 3/18; B23Q 3/064; B23Q 3/067;
(Continued)

(56) References Cited

U.S. PATENT DOCUMENTS

| | | | | |
|---|---|---|---|---|
| 2,513,284 A | * | 7/1950 | Church | ................... B23B 31/00 |
| | | | | 279/123 |
| 2,689,739 A | * | 9/1954 | May | ...................... B23Q 3/067 |
| | | | | 279/5 |

(Continued)

FOREIGN PATENT DOCUMENTS

| | | |
|---|---|---|
| DE | 24 21 670 A1 | 11/1975 |
| DE | 32 16 345 A1 | 11/1983 |
| DE | 41 02 937 A1 | 8/1992 |

(Continued)

OTHER PUBLICATIONS

German-language Search Report issued in counterpart German Application No. 10 2018 001 869.6 dated Nov. 13, 2018 with partial English translation (11 pages).

*Primary Examiner* — Tyrone V Hall, Jr.
(74) *Attorney, Agent, or Firm* — Crowell & Moring LLP

(57) ABSTRACT

A device for mechanically processing a workpiece is provided. The device includes a rotating device and a holding adapter which are mechanically intercoupled such that the rotating device generates a rotation of the holding adapter about a rotation axis, while the holding adapter holds a clamping part for the mechanical treatment of the workpiece such that the holding adapter rotation axis and a longitudinal axis of the clamping part enclose an angle of more than zero degrees.

2 Claims, 4 Drawing Sheets

(51) Int. Cl.
*B23Q 7/04* (2006.01)
*B23B 31/36* (2006.01)

(58) Field of Classification Search
CPC .......... B23Q 1/5468; B23Q 7/02; B23Q 7/04;
B23Q 7/047; Y10T 279/14
See application file for complete search history.

(56) References Cited

U.S. PATENT DOCUMENTS

| | | | |
|---|---|---|---|
| 7,770,901 B2 * | 8/2010 | Leadbeatter | B23B 31/34 |
| | | | 279/132 |
| 10,058,968 B2 | 8/2018 | Junker | |

FOREIGN PATENT DOCUMENTS

| | | |
|---|---|---|
| DE | 200 05 386 U1 | 6/2000 |
| DE | 102 29 134 A1 | 1/2004 |
| DE | 10 2014 203 402 B3 | 7/2015 |

\* cited by examiner

DEVICE FOR MECHANICALLY PROCESSING A WORKPIECE

CROSS REFERENCE TO RELATED APPLICATION

This application claims priority under 35 U.S.C. § 119 from German Patent Application No. 10 2018 001 869.6, filed Mar. 7, 2018, the entire disclosure of which is herein expressly incorporated by reference.

BACKGROUND AND SUMMARY OF THE INVENTION

The present invention relates to a device for mechanically processing a workpiece. The invention furthermore relates to a holding adapter which, for example, is part of a device for mechanically processing a workpiece. The invention moreover relates to a workpiece which has been mechanically processed by the device according to the invention. For example, the workpiece is at least partially composed of a metal, for example steel.

In the prior art, a relative movement between the workpiece and a tool arises in most instances in the mechanical and in particular subtractive processing of workpieces (from metal, for example). It is also known that at least one component (e.g., the workpiece or the tool) is rotated about a rotation axis. A corresponding rotating device which is mechanically coupled to an appropriate clamping installation which fixedly holds the respective component is present for generating the rotation. In the case of complex geometries of the workpieces it is known for dissimilar relative movements to be carried out or for corresponding tools to be used.

In the prior art, DE 32 16 345 A1 for example discloses a device having a pivoting unit by way of which a workpiece is moved about a pivot angle. Conversely, DE 10 2014 203 402 B3 discloses a grinding machine in which grinding disks are used at dissimilar orientations in relation to the workpiece. A device in which rolling tools are readjusted in relation to the workpiece during processing can be derived from DE 24 21 670 A1. A holding installation in which a processing axis (for example a boring axis) is disposed so as to be eccentric (in particular so as to be offset in parallel) in relation to a central axis is found in DE 200 05 386 U1. DE 41 02 937 A1 discloses a group of dissimilar tool receptacle units. The individual group elements differ from one another in terms of the angle between a chuck and the input shaft. Tilting a longitudinal axis of a tool relative to a rotation axis of a drive shaft is described in DE 102 29 134 A1.

The object on which the invention is based lies in proposing a device for mechanically processing a workpiece, or a holding device for such a device, respectively, which represents an alternative to the prior art.

The invention achieves the object by way of a device for mechanically processing a workpiece, having a rotating device and a holding adapter. The rotating device and the holding adapter herein are mechanically intercoupled such that the rotating device generates a rotation of the holding adapter about a rotation axis. Moreover, the holding adapter holds a clamping part for the mechanical treatment of the workpiece such that the rotation axis and a longitudinal axis of the clamping part mutually enclose an angle of more than zero degrees.

For example, the device permits the processing of the workpiece in which the orientation of the rotation axis remains unchanged. Alternatively or additionally, the position of the counterpart in relation to the clamping part (when the clamping part is the workpiece, the counterpart is thus the tool; when the clamping part is the tool, the counterpart is thus the workpiece) can be changed for example only by way of a simple movement (for example a movement perpendicular to the rotation axis). In particular, no complex relative movements between the workpiece and the tool are thus required.

The device relates in particular to the processing of metallic workpieces which moreover are preferably designed so as to be rotationally symmetrical in relation to a longitudinal axis. In one design embodiment, the processing relates in particular to a processing of an end side of the workpiece, wherein the end side is beveled at a specific angle, for example.

The clamping part in the device according to the invention is thus held at an angle in relation to the rotation axis. The clamping part is thus fixed in an oblique manner. Depending on the design embodiment or the application, the clamping part herein is the workpiece per se, or a tool. The oblique position leads to a relative movement of the counterpart in relation to the clamping part (thus of the tool or workpiece) perpendicular to the rotation axis leads to a processing of the clamping part at an inclination angle. It is thus sufficient, for example, when the counterpart performs only a simple movement in relation to the clamping part.

For example, when an end side of the workpiece is beveled, this is possible by way of a relative movement at a right angle in relation to the rotation axis. When the counterpart in relation to the clamping part is additionally disposed so as to likewise rotate about an axis, the device and the counterpart, for example, thus perform in each case rotations about identical and/or parallel axes.

The rotating device generates the actual rotations and is mechanically coupled to the holding adapter such that the holding adapter, and on account thereof ultimately the clamping part, is rotated.

One design embodiment lies in that the holding adapter is designed so as to be largely circular-cylindrical, and in that an end side of the holding adapter is obliquely cut off at a pre-definable angle. The holding adapter in this design embodiment is embodied so as to be at least partially in the shape of a truncated cone or a truncated cylinder. The end side in particular does not terminate in a circular-cylindrical shape but is beveled.

According to one alternative or additional design embodiment, an equalization device which equalizes an imbalance that is caused by the clamping part is furthermore present. Since the clamping part is disposed in an oblique manner, the rotations about the rotation axis lead to an imbalance which here is compensated for, or at least minimized, respectively, by the equalization device. The design embodiment of the equalization device is inter-alia dependent on the angle between the longitudinal axis of the clamping part and the rotation axis, as well as on the weight of the clamping part.

One design embodiment lies in that the holding adapter along the rotation axis has a greater axial extent than the equalization device. The holding adapter in this design embodiment protrudes beyond the equalization device in the axial direction (when viewed from the rotating device).

One alternative or additional design embodiment provides that a diameter of a circle defined by the holding adapter and a diameter of a circle defined by the equalization device are substantially identical.

In one design embodiment, the basic shapes of the holding adapter and the equalization device are in each case circular-cylindrical or at least rotationally symmetrical shapes.

The equalization device in one design embodiment is designed such that said equalization device at least partially equalizes the location of the circular cylinder of the holding adapter that is absent on account of the bevel of the holding adapter.

One design embodiment lies in that the holding adapter is designed as a collet chuck. The holding adapter in this design embodiment is thus configured as a clamping means which possesses a sleeve, i.e. the collet, the clamping part being incorporated in the interior of said clamping means so as to be fixed by way of radial forces in the clamped state.

One alternative or additional design embodiment provides that the holding adapter has a flange bush and a clamping bush, that the flange bush comprises the clamping bush, and that the clamping bush in a clamped state exerts a radial force on the clamping part. In this design embodiment, a clamping bush receives the clamping part. This in particular in one design embodiment is associated with the clamping bush having a longitudinal axis, the latter conjointly with the rotation axis enclosing an angle. The oblique stance of the clamping part is thus caused in that the clamping bush is disposed in a correspondingly oblique manner. The clamping bush herein is surrounded by the flange bush. In one design embodiment, the end side of the flange bush, functioning as the end side of the holding adapter, is designed so as to be beveled and/or at least partially circular-cylindrical.

One design embodiment lies in that the flange bush is at least in part composed of aluminum and is hard-anodized. The durability is enhanced on account of this design embodiment.

An alternative or additional design embodiment provides that the clamping part is the workpiece to be mechanically processed.

One design embodiment lies in that the clamping part is a tool for mechanically processing the workpiece.

The invention furthermore relates to a holding adapter for holding a clamping part, in particular for mechanically processing the workpiece. The holding adapter herein is designed for a mechanical connection to a rotating device. The rotating device generates a rotation of the holding adapter about a rotation axis. The holding adapter herein holds the clamping part such that the rotation axis and a longitudinal axis of the clamping part mutually enclose an angle of more than zero degrees. The design embodiments above apply to the holding adapter since the holding adapter can in particular be embodied according to one of the afore-mentioned design embodiments. A repetition is thus dispensed with.

The invention moreover relates to an assembly having a holding adapter and an equalization device according to one of the afore-mentioned design embodiments.

The invention moreover relates to a workpiece which has been mechanically processed by a device according to one of the afore-mentioned design embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
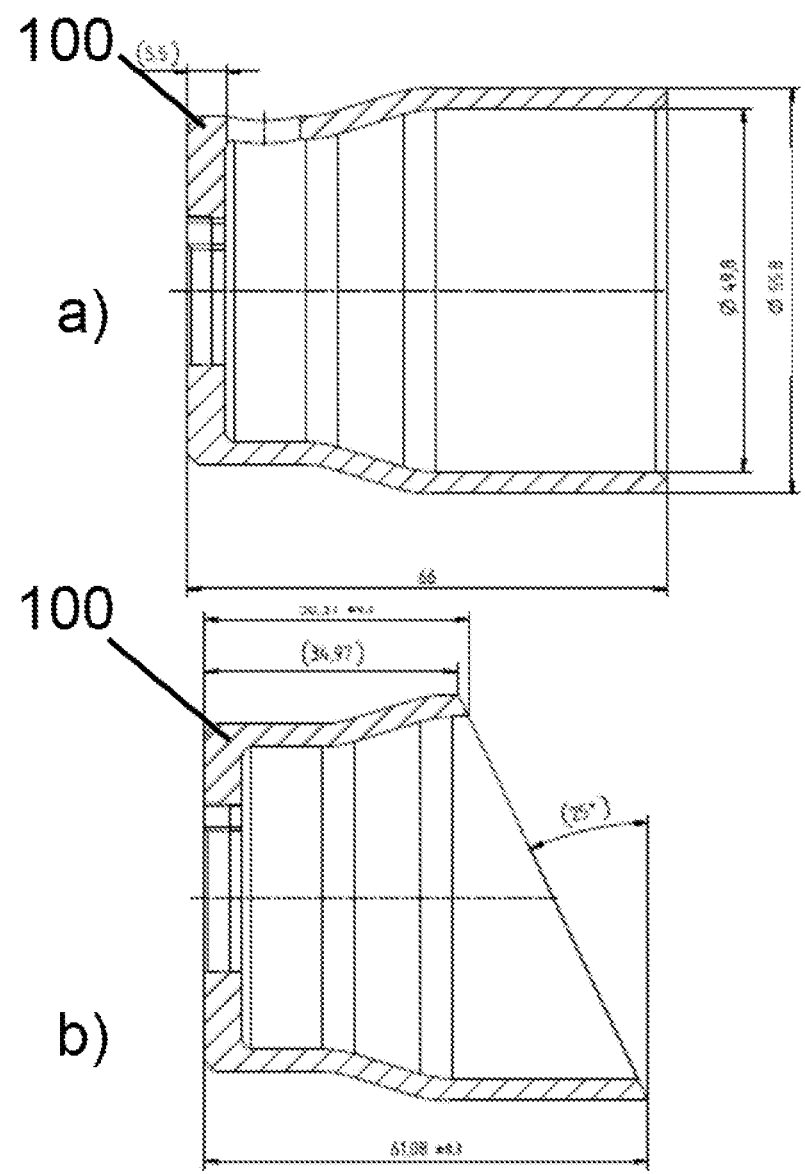
FIG. 1 shows in each case one section through a workpiece before (FIG. 1a)) and after (FIG. 1b)) mechanical processing in accordance with an embodiment of the present invention.

FIG. 1 shows a workpiece 100 before (FIG. 1a)) and after (FIG. 1b)) mechanical and subtractive processing.

The mechanical processing herein lies in that an end side of the per se circular-cylindrical work piece 100 is beveled at a pre-defined angle, presently in an exemplary manner 25°. This is performed in that material of the workpiece 100 is subtracted at said end side. The processing in the example shown likewise leads to a shortening of the length of the workpiece 100.

Figure 2:
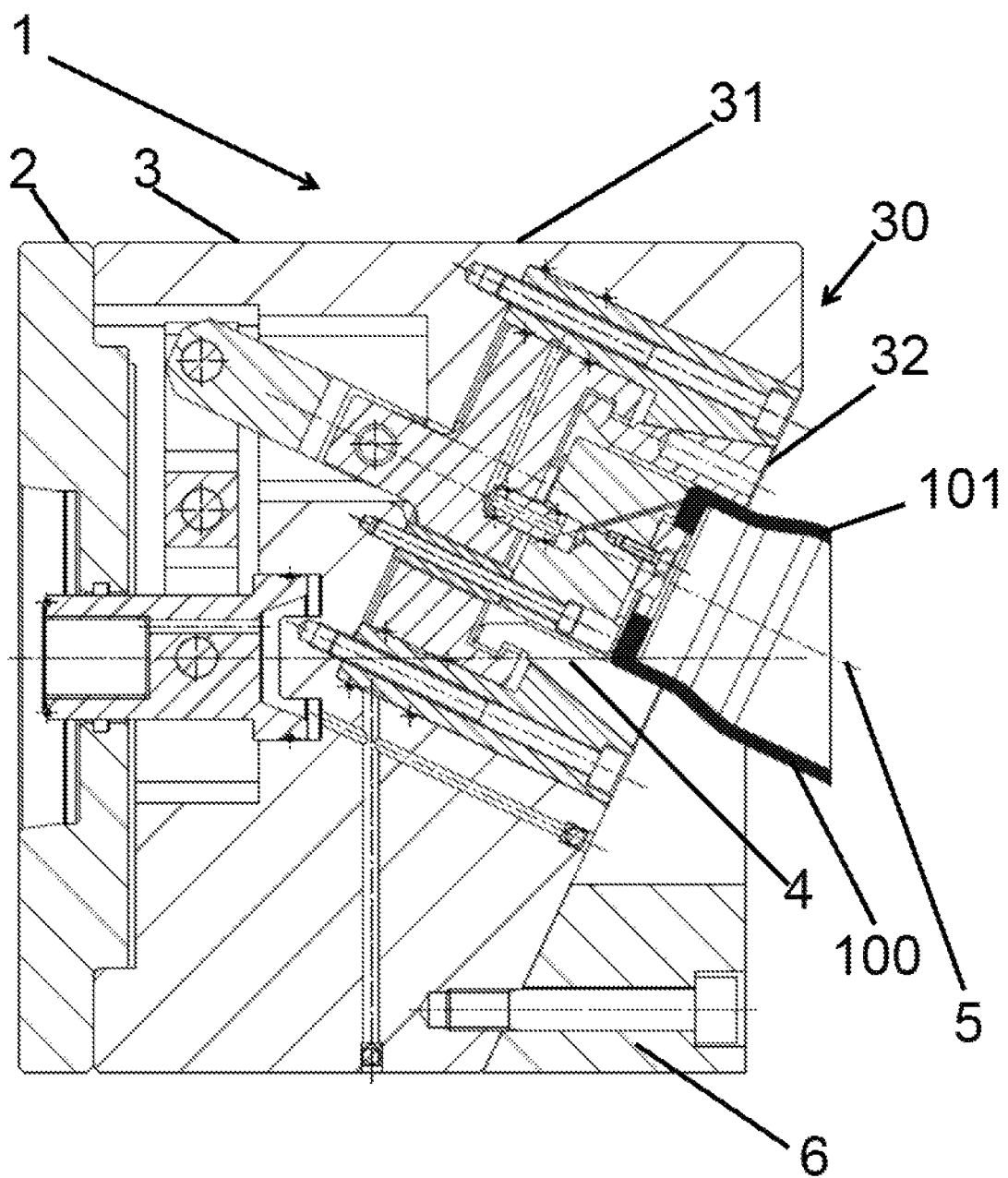
FIG. 2 shows a section through a device for mechanical processing in accordance with an embodiment of the present invention, having a clamped clamping part.
Figure 3:
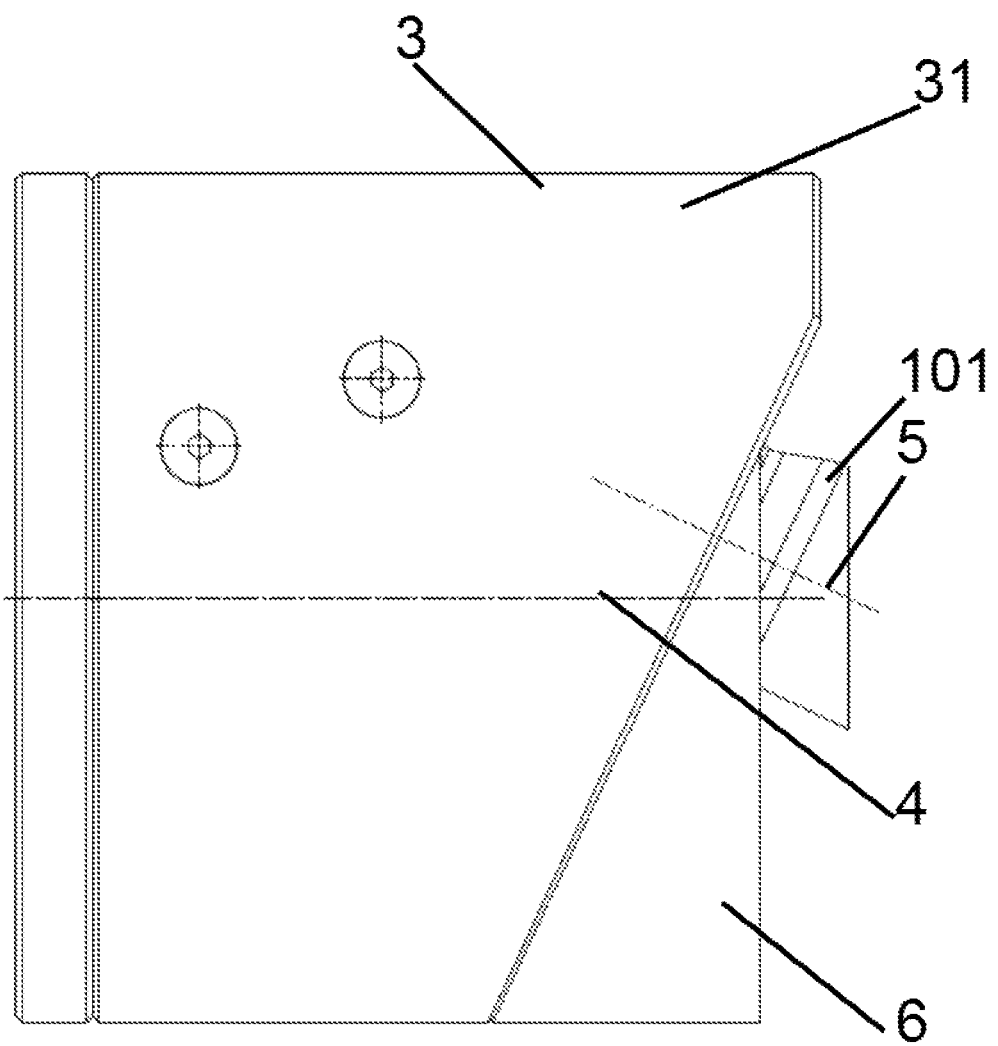
FIG. 3 shows a lateral illustration of the device of FIG. 2.
Figure 4:
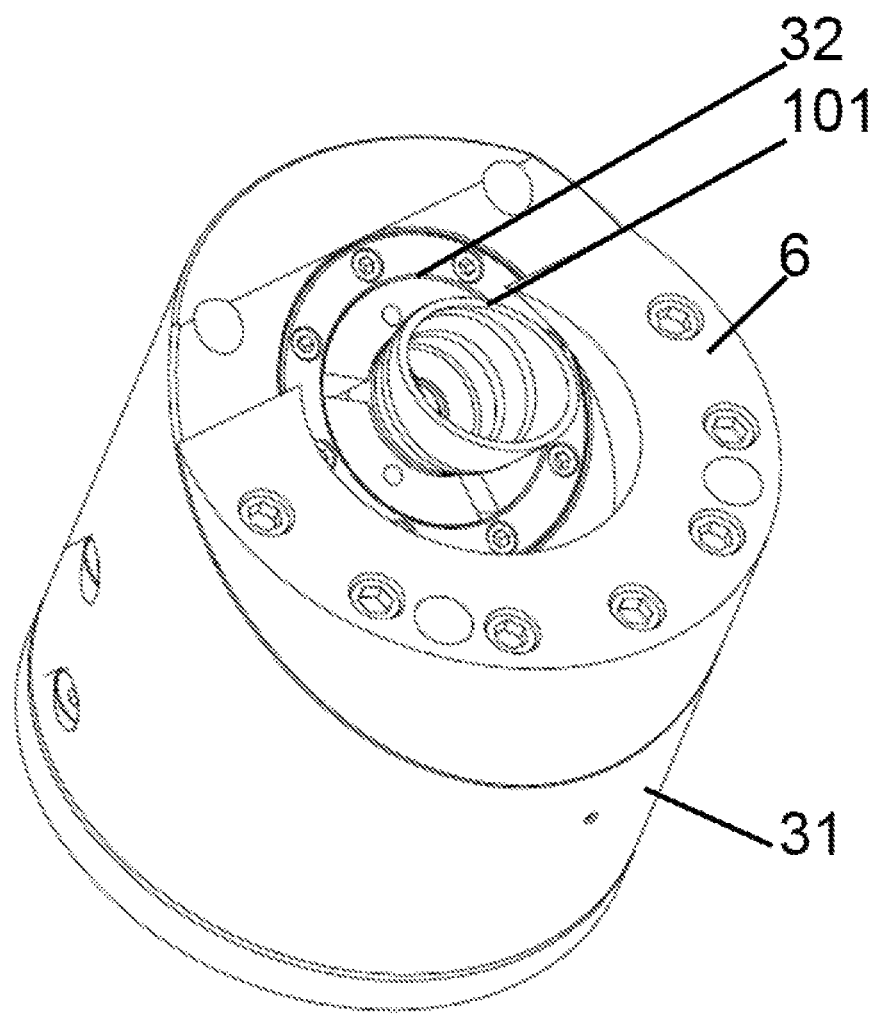
FIG. 4 shows a spatial illustration of the device of FIG. 2.

The following images FIG. 2 to FIG. 4 show an example design embodiment of a device 1 for holding a clamping part 101.

The clamping part 101 herein, depending on the design embodiment of the device 1 or depending on the application, is either the workpiece 100 per se or a tool by way of which the workpiece 100 is processed.

In the processing, the workpiece 100 is thus in each case processed by a tool (not illustrated here), wherein the clamping part 101 that is fastened in the device 1 for processing is rotated about a rotation axis 4 by the device 1.

The clamping part 101 here is a particularly rotationally symmetrical about the longitudinal axis 5.

The device 1 possesses an actual rotating device 2 which causes the rotations about the rotation axis 4.

The holding adapter 3 is present so as to be mechanically coupled to the rotating device 2, said holding adapter 3 being the actual support of the clamping part 101. The holding adapter 3 herein can be removed in an arbitrary manner from the rotating device 2. In the design embodiment shown, a flange is connected to the rotating device 2 by way of a tie rod. Instead of the lever mechanism illustrated here for fastening the holding adapter 3, a hydraulic mechanism having a corresponding reservoir is also to be considered, for example.

The holding adapter 3 furthermore possesses a flange bush 31. A recess in which a clamping bush 32 is disposed is present in that end side of the flange bush 31 that faces away from the rotating device 2.

The clamping bush 32 in turn contacts further components as component parts of the holding adapter 3. The components in their entirety have the effect that the clamping bush 32 in a clamped state exerts a radial force on the clamping part 101, thus fixedly holding the latter.

On account of the particular design embodiment of the holding adapter 3, the clamping part 101 is held or fixed such that a longitudinal axis 5 of the clamping part 101 (and here in particular also of the clamping bush 32) and the rotation axis 4 conjointly enclose an angle of more than zero. In other words, the clamping part 101 is located so as to be oblique in the holding adapter 3.

As can be seen in the image FIG. 2, the oblique position affects the processing. The clamping part 101 here is simultaneously the workpiece 100, the end side thereof having been processed in the shape illustrated. When the tool has thus been moved at a right angle in relation to the rotation axis 4, the end side of the workpiece 100 has thus also been subtracted in an oblique manner.

The flange bush 31 has a substantially circular-symmetrical shape and here is in particular the cylinder. That end side 30 of the flange bush 31 that faces away from the rotating device 2 is partially beveled. This permits the assembly of the components of the holding adapter 3, mentioned above, for implementing the clamping function, for example.

The flange bush 31 in the exemplary design embodiment shown is composed substantially of aluminum and is hard-anodized. This reduces the weight of the holding adapter 3, on the one hand, and on the other hand enhances the durability of the holding adapter 3.

Since the clamping part 101 is located so as to be oblique in the device 1, an imbalance would be created by the rotation about the rotation axis 4.

Such an imbalance in the embodiment of the device 1 shown is minimized or compensated for by an equalization device 6. The equalization device 6 is thus also part of the holding adapter 3 since the imbalance depends inter alia on the angle of the oblique position of the clamping bush 32, or of the clamping part 101, respectively. Therefore, the equalization device 6 has in each case also to be adapted to the orientation of the clamping part 101 and the properties of the latter.

The equalization device 6 in the design embodiment shown, like the holding adapter 3, is also designed so as to be circular-cylindrical, wherein the flange bush 31 and the equalization device 6 define in each case a circle having a substantially identical radius. The equalization device 6 in the version illustrated thus corresponds to the portion of the missing end side of the flange bush 31.

It can furthermore be seen that the equalization device 6 along the rotation axis 4 has a smaller axial extent than the flange bush 31. A shoulder thus exists on the end side 30 of the holding device 3.

The equalization device 6 in the design embodiment shown is connected to the flange bush 31 by way of a screw.

The device 1 has the advantage that an air contact check can be carried out, so as to identify the contact of the clamping part 101 by directing an airflow through the contact face of the clamping part 101 on the holding adapter 3. Moreover, a higher stability in the fixing of the clamping part 101 results on account of the axial traction effect.

It can be seen in the lateral view of FIG. 3 that the flange bush 31 extends farther toward the front than the equalization device 6. It can furthermore be seen that, on account of the equalization device 6, an overall largely circular-cylindrical shape of the holding adapter 3 results again about the rotation axis 4. A largely rotationally symmetrical shape of the holding adapter 3 and the equalization device 6 is thus present. The longitudinal axis 5 of the clamping part 101, or of the clamping bush 32, respectively, is also plotted here, said longitudinal axis 5 conjointly with the rotation axis 4 forming the angle of more than zero degrees.

FIG. 4 shows how the clamping part 101 is surrounded by the clamping bush 32. The partial bevel of the end side of the flange bush 31, and the equalization of the bevel of the holding adapter 3 by way of the equalization device 6, can furthermore be seen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for mechanically processing a metallic workpiece, comprising:
   a rotating device; and
   a holding adapter,
   wherein
      the rotating device and the holding adapter are mechanically intercoupled such that the rotating device generates a rotation of the holding adapter about a rotation axis, and
      the holding adapter holds a clamping part for mechanical treatment of the workpiece such that the rotation axis and a longitudinal axis of the clamping part enclose an angle of more than zero degrees,
      the holding adapter is circular-cylindrical,
      an end side of the holding adapter facing away from the rotating device is obliquely cut off at a pre-defined angle relative to a longitudinal axis of the circular-cylindrical holding adapter,
      an equalization device of the holding adapter configured to equalize an imbalance about the rotating device rotation axis caused by the rotation axis being at the angle of more than zero degrees from the longitudinal axis of the clamping part,
      the holding adapter along the rotation axis has a greater axial length than the equalization device,
      a diameter of a circle defined by the holding adapter and a diameter of a circle defined by the equalization device are identical,
      the holding adapter has a flange bush surrounding a clamping bush, the flange bush having a beveled surface at an end of the flange bush facing away from the rotating device, and
      the clamping bush in a clamped state exerts a radial force on the clamping part.

2. The device as claimed in claim 1, wherein the flange bush is composed of aluminum and is hard-anodized.

* * * * *